Dec. 12, 1967 J. T. GARTRELL 3,357,146
BUILDING PANEL SPLICING
Filed Feb. 19, 1964 2 Sheets-Sheet 1
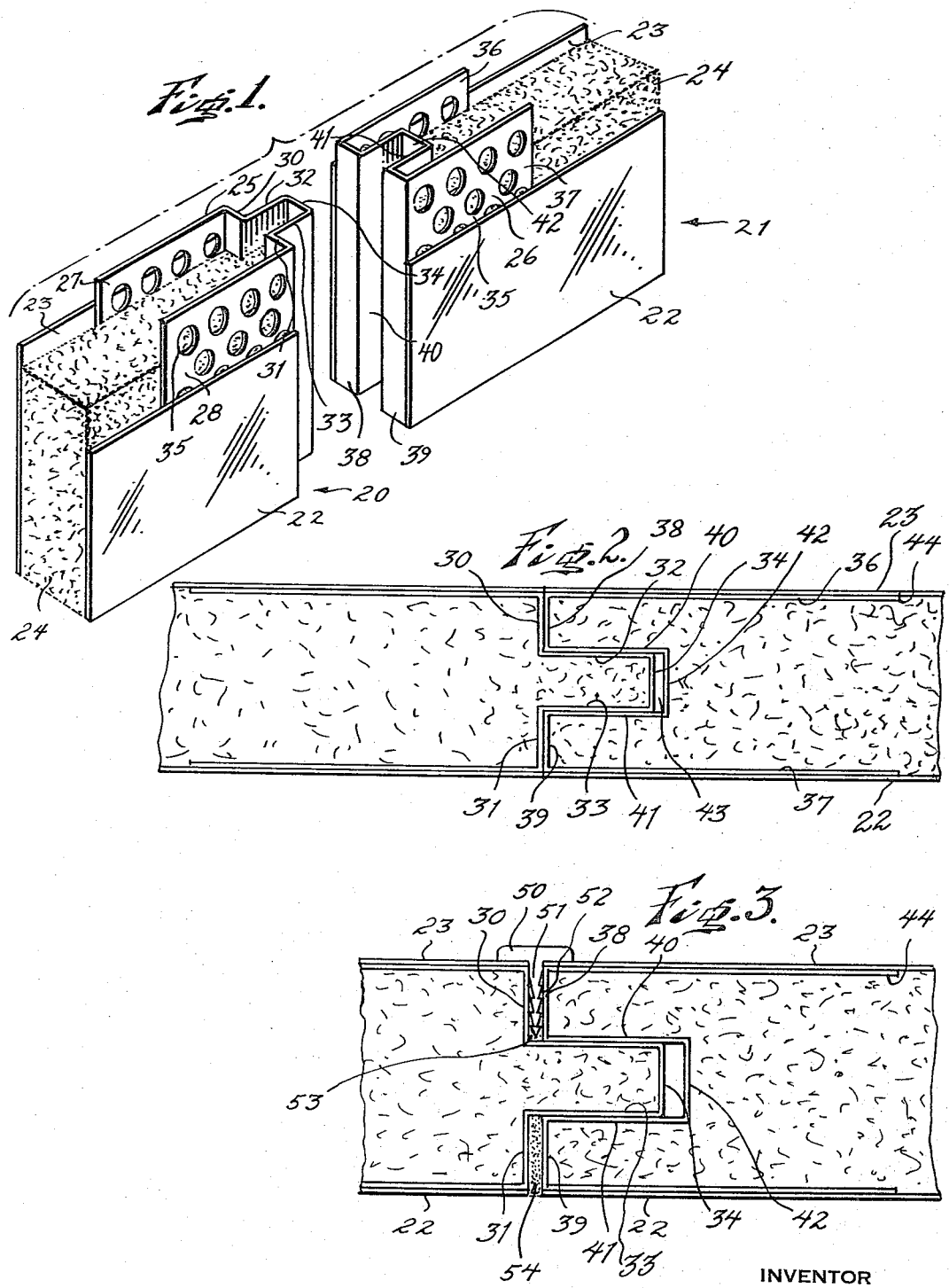
INVENTOR
JOHN T. GARTRELL
BY
ATTORNEYS Dec. 12, 1967 J. T. GARTRELL 3,357,146
BUILDING PANEL SPLICING
Filed Feb. 19, 1964 2 Sheets-Sheet 2
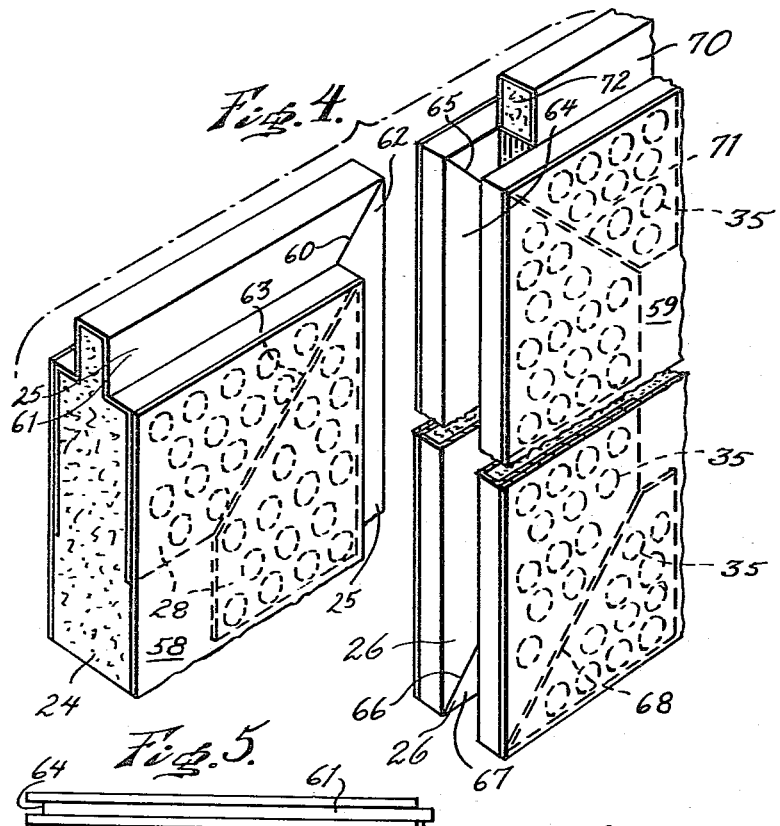
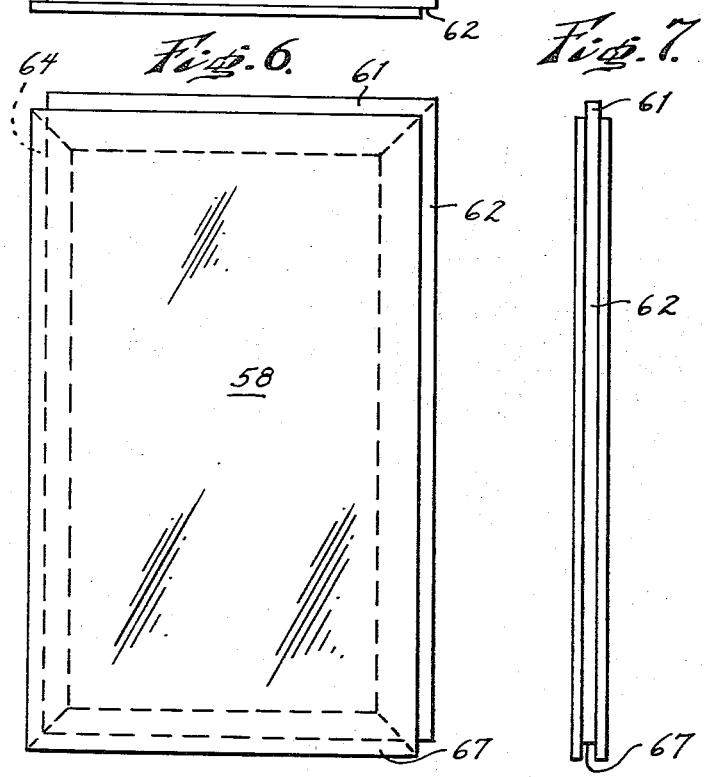
INVENTOR
JOHN T. GARTRELL
BY
ATTORNEYS

# United States Patent Office 3,357,146
Patented Dec. 12, 1967

3,357,146
BUILDING PANEL SPLICING
John T. Gartrell, Pottsville, Pa., assignor to Birdsboro Corporation, Birdsboro, Pa., a corporation of Pennsylvania
Filed Feb. 19, 1964, Ser. No. 345,920
2 Claims. (Cl. 52—309)

This invention pertains to a panel joint and more particularly to a joint for use with a sandwich panel construction.

A purpose of the invention is to provide a joint for use with a sandwich panel construction wherein the panels include a core material and an outer skin.

A further purpose is to provide a panel joint utilizing a tongue and groove construction wherein the outer skin of the panels will meet in a smooth and abutting relationship.

A further purpose is to use formed metal mating sections to provide a structurally sound and neat appearing panel joint for sandwich panels.

A further purpose is to use perforations in the formed metal sections to achieve a sound anchor of the metal sections to the core material and outer skin of the panels.

A further purpose is to secure a continuously extending core and continuously extending outer skin at the joint.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a fragmentary perspective view of the joint of the invention with the elements peeled away to more clearly show the details.

FIGURE 2 is a plan section of the joint of FIGURE 1 showing the tongue and groove interlock.

FIGURE 3 is a plan section of the joint of the invention showing alternate means for fastening the joint.

FIGURE 4 is a fragmentary exploded perspective of the joint being used in a wall panel design.

FIGURE 5 is a top plan view of a panel embodying the joint of the invention.

FIGURE 6 is a front elevational view of the panel of FIGURE 5.

FIGURE 7 is a right side elevational view of the panel of FIGURE 6.

Describing in illustration but not in limitation and referring to the drawings:

Extensive use is being made in the building field of panels having an outer skin of vitreous porcelain enamel steel, sheet metal, galvanized steel, aluminum, cement asbestos board, Masonite board, or other acceptable facing materials. The skin is laminated to an insulated blanket material consisting of either solid or foamed-in-place core materials of plastic, foamglass, composition perlite materials, or one of numerous other core materials commonly used for this purpose. These panels are used in exterior as well as interior applications and have received extensive acceptance in the construction industries.

In the past, the panels have stood up extremely well in service but difficulty has been encountered at the joints between the panels. In many instances, the panels have been connected to supporting members in a manner wherein the panels abut against each other but have no positive connection between panels. A sealing strip has been placed over the joint to prevent moisture as well as heat from passing through the joint. Generally, this has been unsatisfactory since the wall in effect is composed of individually suspended panels which are not interlocked in any way.

Efforts have been made to interlock the panels at their edges by forming projections and complementary grooves along the edges of the panels. In view of the laminated structure of the panels, the core materials occupy virtually the entire space along the section of the panel and attempts to interlock the panels in this core material have met with failure because of the low tensile strength of the core materials.

In other instances, efforts have been made to utilize separate stiffeners which pass transversely through the panels in order to achieve satisfactory joints. These stiffeners have been bulky and have prevented an abutting contact between the panels. Furthermore, the outer skin has been separated between panels by these stiffener inserts so that a bulky and unsightly joint results.

In the present invention, complementary joining strips in the form of tongue and groove portions are applied to the core and to the face skin in a manner which yields a strong and attractive splice between panels. These tongue and groove joining strips are formed of a metal section having side members densely perforated to permit the core material to pass through the perforations when a "foamed-in type" of core is used, or to permit adhesive to lodge in the openings and securely bond the strips to the core and skin when preformed core slabs are used. In the splice of the invention, the face skins abut each other in a manner unattainable in the prior art techniques. The design of the panel joining strips permits a further sealing between the panels by normal caulking methods or by other sealant methods. In an alternative embodiment, a simple T section in the form of a decorative strip can be used if desired to hide the normal abutment line on the face of the panels at the splice.

By means of the splicing strips of the invention, there is not only simplicity of assembly and a more neat appearing splice or joint but there is achieved additionally a much stronger joint. The metallic skin or outer skin itself is utilized to aid the core in sustaining the forces created at the joint. Hence, a complete metallic encased sandwich panel is provided which is strong, neat appearing and easy to assemble.

Referring to the drawings, we see there sandwich type laminated panels 20 and 21. Each of the panels has an outer skin 22 and 23 of, for instance, vitreous porcelain enamel steel, sheet metal, galvanized steel, aluminum, cement asbestos board, Masonite board or other acceptable facing materials. A core material 24 serves as an insulating blanket between outer skins 22 and 23 and adheres to the skins. The core material consists of either solid or "foamed-in-place" core materials of plastic, foamglass, composition perlite materials and/or one of numerous other core materials commonly used for this purpose. In the event "foamed-in-place" cores are used, the material itself will adhere to the skin as it hardens. Where preformed cores are used, a suitable adhesive will be used to bond the core and skin.

The tongue and groove strips of the present invention include a tongue strip 25 and a groove strip 26. The tongue strip 25 comprises in section longitudinally extending sides 27 and 28, inwardly directed transverse flanges 30 and 31, and webs 32 and 33 extending parallel to the sides 27 and 28, and a transversely extending closure element 34 integral with and extending between the webs 32 and 33.

Sides 27 and 28 of the tongue strip 25 are suitably perforated at a plurality of positions by openings 35 suitably circular in shape.

The groove strip 26 in section includes sides 36 and 37 which support transverse flanges 38 and 39 extending inwardly a distance corresponding to transverse flanges 30 and 31 of the tongue strip 25. A grooved portion in the strip 26 is formed by webs 40 and 41 joined together by transversely extending element 42.

The tongue strip 25 and groove strip 26 are so shaped that when the splice is assembled as shown in FIGURE 2, the flanges 30 and 38, flanges 31 and 39, webs 32 and 40, and webs 33 and 41 respectively abut. A space 43 exists between the transverse portions 34 and 42.

In the preferred embodiment, the outer faces of sides 36 and 37 of groove strip 26 are spaced with respect to each other at a distance equal to the normal distance between the inner faces of the panel skins 22 and 23. Hence, the sides 36 extend into the core as shown at 44 in FIGURES 2 and 3. A similar arrangement exists in the tongue strip 25. In most instances, the sides 36 and 37 will be thin enough to embed themselves in the core so that no bump is presented on the outer surface of the skins and the skins will lie respectively in flat planes parallel to each other.

In assembly, where the core material 24 is of a foamed-in type, the tongue strip 25 and groove strip 26 are positioned with respect to the skins 22 and 23 and the foam material is poured in. The foam material will pass through the perforations 35 in the side members and into contact with the inner faces of the skin at these locations. In addition, the core will be securely bonded to the inner surfaces of the tongue strip 25 and groove strip 26 and to the inner faces of the outer skins beyond the tongue and groove strips. This arrangement will provide a strong, compact panel element.

In the event the panel is made from a standard core material in preformed layer form, the core is bonded to the tongue groove strips and inner surfaces of the outer skins by a separate adhesive of a suitable type. The adhesive passes through the perforated holes 35 on the sides and securely bonds the core, strip, and skins.

The splice of the invention may be formed by abutting the panels together as shown in FIGURE 2 or an alternative arrangement can be used as shown in FIGURE 3, where a metal key member 50 of T cross-section is inserted into the joint between transverse flanges 30 and 38 so that the head of the T 50 extends over and covers skin portions 23.

The T 50 may have a head design to provide an attractive closure at the joint. The web 51 of T 50 has teeth 52 which are arrow shaped and which when set in mastic 53 originally inserted into the opening, receives and holds the T 50 in place.

In the alternative, a plastic caulking of any suitable material 54 is inserted into the splice as seen in FIGURE 3, by for instance a caulking gun, so that a sound and neat appearing joint results.

A corner arrangement is shown between mating panels 58 and 59 in FIGURE 4. A horizontal tongue strip 25 extends across at 61 and is united to a tongue strip 25 extending vertically at 62 by a joint mitered at a suitable angle, for instance, 45 degrees, formed at 60. The miter extends throughout the side members 28 as at 63 so that a sound and sturdy corner construction results. Groove strip 26 extends vertically at 64 and is bevelled at its upper end 65 and its lower end 66. A horizontal groove strip 26 at 67 is mitered at 68 and is inserted at the bottom of the panel. At the top, a tongue strip 70 is mitered at one end at 71 and is cut back at 72 in order to provide clearance for the insertion of the tongue strip 25 at the miter 60 of the adjacent panel.

An entire typical panel 58 is shown in FIGURES 5 to 7 of the drawings. As seen in FIGURE 6, the panel 58 of the invention will have a tongue strip 25 across the top at 61 and right side at 62. The panel will have a groove strip 26 along the left side at 64 and along the bottom at 67. In assembling the splice, a tongue strip 26 at 62 along the right side of one given panel 58 will engage the groove strip 26 at 64 along the side of an adjacent panel 59 to form a splice as seen in FIGURE 2. In the alternative, splices as shown in FIGURE 3 can be used. Likewise the upper tongue strip 25 at 61 of a given panel 58 will engage the lower groove strip 26 at 67 of an upper panel. Assembled panels can be arranged so that their splices coincide vertically and horizontally or in the alternative, the horizontal splices or the vertical splices can be staggered in adjacent panels.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a splice for sandwich type panels having spaced outer skins and an inner core bonded to the skins, a metal tongue strip extending longitudinally of a first panel and having first sides extending along the panel between the core and in contact with the skin, first perforations in the sides, first bonds extending through the perforations and securing the skin, side, and core, first inwardly directed transverse flanges integral with the sides, first webs extending from the first transverse flanges and forming the sides of a tongue, and a first transversely extending closure section at the end of the first webs and forming the end of the tongue, and a metal groove strip extending longitudinally of a second panel in abutting relation to the first panel and having second sides extending along the second panel between the core and in contact with the skin, second perforations in the second sides, second bonds extending through the second perforations and securing the skin, side, and core, second inwardly directed transverse flanges integral with the second sides, second webs extending from the transverse flanges and forming the sides of the groove and a second transversely extending closure section at the end of the second webs and forming the end of the groove; each of the first inwardly directed transverse flanges extending in abutting relationship to one of the second inwardly directed transverse flanges, and each of the first webs extending in abutting relationship to one of the second webs.

2. A splice of claim 1 wherein the first and second bonds are formed by the core of the first and second panels respectively.

References Cited

UNITED STATES PATENTS

| | | | |
|---|---|---|---|
| 2,142,305 | 1/1939 | Davis | 52—593 X |
| 2,270,672 | 1/1942 | Heeren | 52—593 X |
| 2,651,391 | 9/1953 | Havens | 52—461 X |
| 2,714,231 | 8/1955 | Brunton | 52—461 X |
| 2,934,934 | 5/1960 | Berliner | 52—309 |
| 2,995,784 | 8/1961 | Driscoll | 52—309 |
| 3,113,401 | 12/1963 | Rose | 52—593 X |

FOREIGN PATENTS

| | | |
|---|---|---|
| 672,647 | 10/1963 | Canada. |

DAVID J. WILLIAMOWSKY, *Primary Examiner.*

DENNIS L. TAYLOR, HARRISON R. MOSELEY,
*Examiners.*